(12) United States Patent
Patinet

(10) Patent No.: US 6,817,808 B1
(45) Date of Patent: Nov. 16, 2004

(54) ROTATABLE PIPELINE END TERMINATION

(75) Inventor: Jean-Francois Patinet, Houston, TX (US)

(73) Assignee: Mentor Subsea Technology Services, Inc., Houston, TX (US)

( * ) Notice: Subject to any disclaimer, the term of this patent is extended or adjusted under 35 U.S.C. 154(b) by 12 days.

(21) Appl. No.: 10/441,562

(22) Filed: May 20, 2003

(51) Int. Cl.⁷ .............................. F16L 1/16; F16L 1/20
(52) U.S. Cl. ..................... 405/170; 405/158; 405/169; 166/341
(58) Field of Search ................................ 405/158, 170, 405/172, 184.4; 248/49, 55, 62; 166/341

(56) References Cited

U.S. PATENT DOCUMENTS

| 4,252,466 A | * | 2/1981 | Berti et al. ................. 405/172 |
| 4,494,893 A | * | 1/1985 | Migliavacca ................. 405/172 |
| 5,018,903 A | * | 5/1991 | O'Donnell et al. ......... 405/170 |
| 5,290,127 A | * | 3/1994 | Foster et al. ................. 405/172 |
| 5,443,329 A | * | 8/1995 | de Geeter ................... 405/172 |
| 6,004,072 A | * | 12/1999 | Cunningham ............... 405/170 |
| 6,450,736 B1 | * | 9/2002 | Eck et al. ................. 405/184.4 |
| 6,499,773 B1 | * | 12/2002 | Ostergaard ................. 285/408 |

* cited by examiner

Primary Examiner—Thomas B. Will
Assistant Examiner—Tara L. Mayo
(74) Attorney, Agent, or Firm—D. Neil LaHaye; Eric Marich

(57) ABSTRACT

A rotatable pipeline end termination. A conduit is attached to an end of the pipeline. One or more collars are attached to the conduit. A ring is rotatably received on the collar. A pipeline support structure such as a flat bottom closed skid having the function of a mud mat is attached to the ring. The ring may be free floating for rotation or may be manually activated to rotate the termination to the correct orientation so as to be flat on the sea floor for full bearing contact.

2 Claims, 3 Drawing Sheets

ROTATABLE PIPELINE END TERMINATION

BACKGROUND OF THE INVENTION

1. Field of the Invention

The invention is generally related to the laying and installation of underwater and offshore pipeline and more particularly to the structure attached to the pipe end line that is used to position the pipeline for tie-in, disconnection and/or reconnection of the pipeline with another line.

2. General Background

Underwater (river, lake, or reservoir) and offshore/marine pipelines are installed by the use of a variety of techniques such as S-lay, reel-lay, or J-lay on the surface or bottom towed. In the S-lay and J-lay techniques, a length of pipe is added to the upper end of pipeline that has already been installed, the vessel moves forward along the pipeline path to install the new section of pipe, another section of pipe is added, and the process is repeated until the entire pipeline has been installed. In the reel-lay technique, the sections of pipe are welded together and wound onto a large reel on a vessel. The pipe is then unwound from the reel, straightened, and laid offshore as the vessel moves along the predetermined path for the pipeline. In surface or bottom towed operations, the onshore prefabricated end tested length is launched and tracked to the final scheduled location.

Pipelines tie in with other connections such as a manifold or a "T" or "Y"-connector for branch arrangements or a wellhead that produces oil or natural gas. At such connections, it is essential that the pipeline be positioned at or above the sea floor and in the proper orientation for successfully making the necessary connection. To support the pipeline at or above the underwater sea floor, the pipeline head, or end line is typically supported by a bottom closed support structure that spreads the load of the pipeline across an area of the underwater sea floor.

Because a pipeline may rotate or twist about its longitudinal axis during its installation and descent to the sea floor, it is possible that the end line support structure, as well as any underwater connecting aids on the pipeline and connector guides, may not land on the sea floor in the proper orientation. The result is that the support structure does not lay flat on the sea floor and thus does not provide proper support to the pipeline on the sea floor. This causes difficulty in subsequent tie-in, disconnection, and/or reconnection to the pipeline because of improper orientation of fittings and/or connecting aids.

SUMMARY OF THE INVENTION

The invention addresses the above need. What is provided is a rotatable pipeline end termination. A conduit is attached to an end of the pipeline. One or more collars are attached to the conduit. A ring is rotatably received on the collar. A flat bottom closed pipeline support structure such as a mud mat is attached to the ring. The ring may be free floating for rotation or may be manually or remotely activated to rotate the termination to the correct orientation.

BRIEF DESCRIPTION OF THE DRAWINGS

For a further understanding of the nature and objects of the present invention reference should be made to the following description, taken in conjunction with the accompanying drawings in which like parts are given like reference numerals, and wherein.

DETAILED DESCRIPTION OF THE PREFERRED EMBODIMENT

Figure 1:
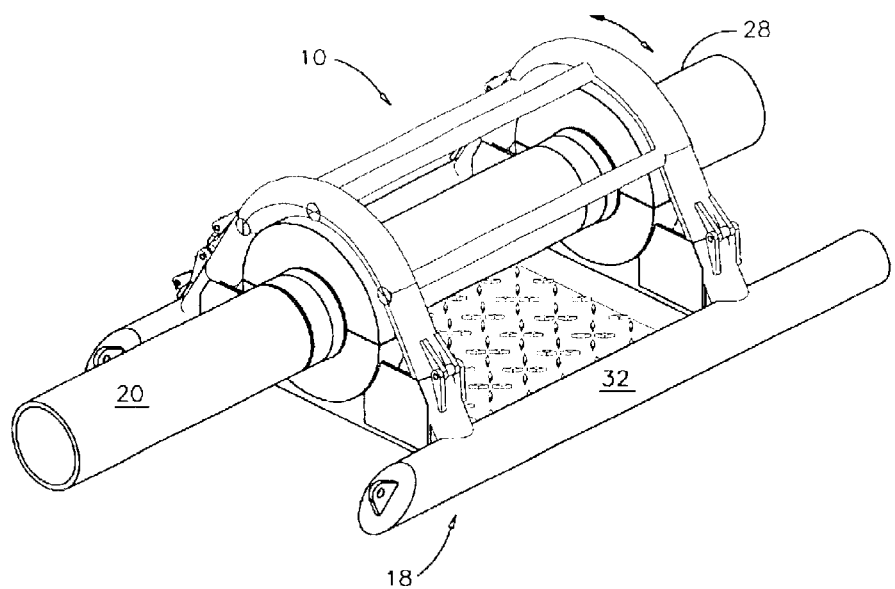
FIG. 1 is a perspective view of the installed invention.
Figure 4:
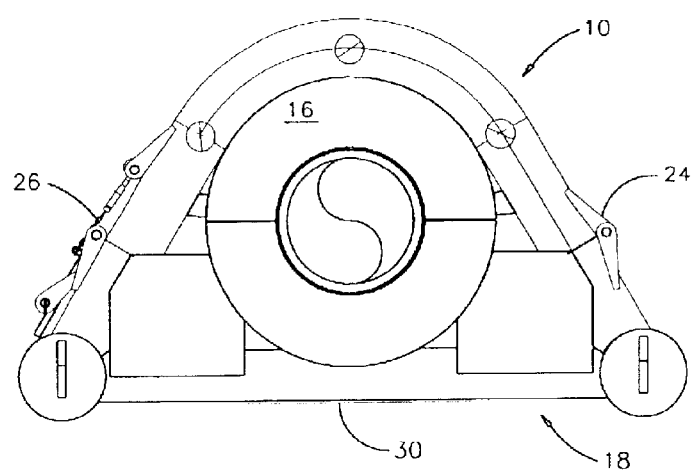
FIG. 4 is an end view of the installed invention.
Figure 2:
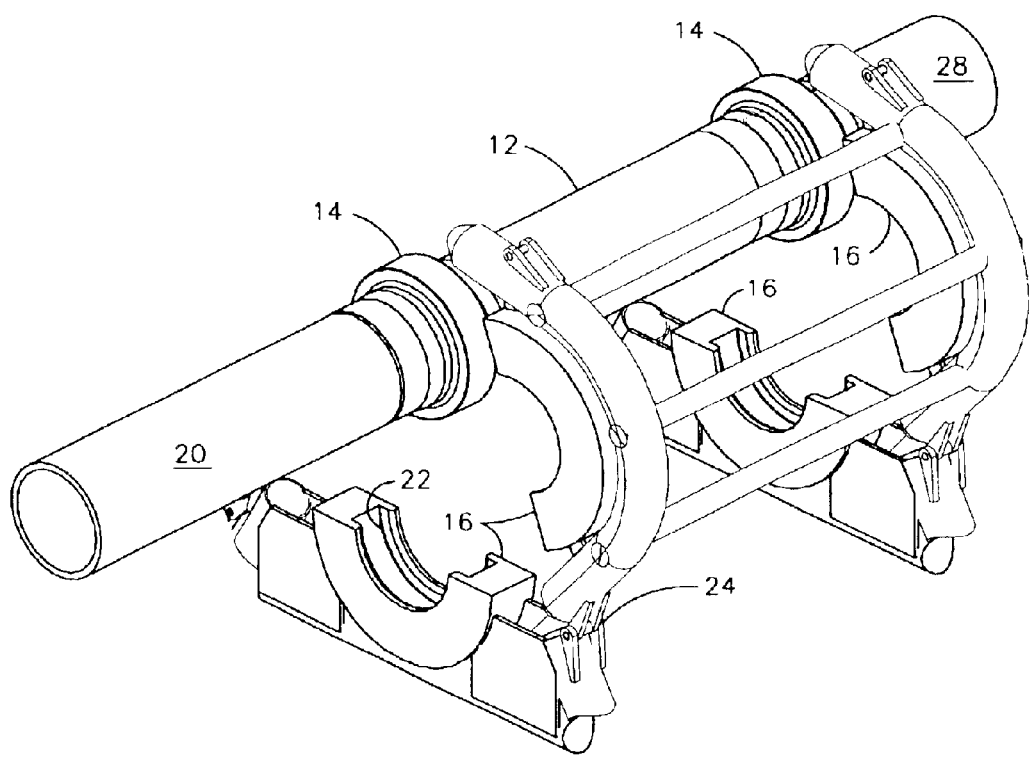
FIG. 2 is a perspective view of the invention with the rings and support structure not attached to the collars.
Figure 3:
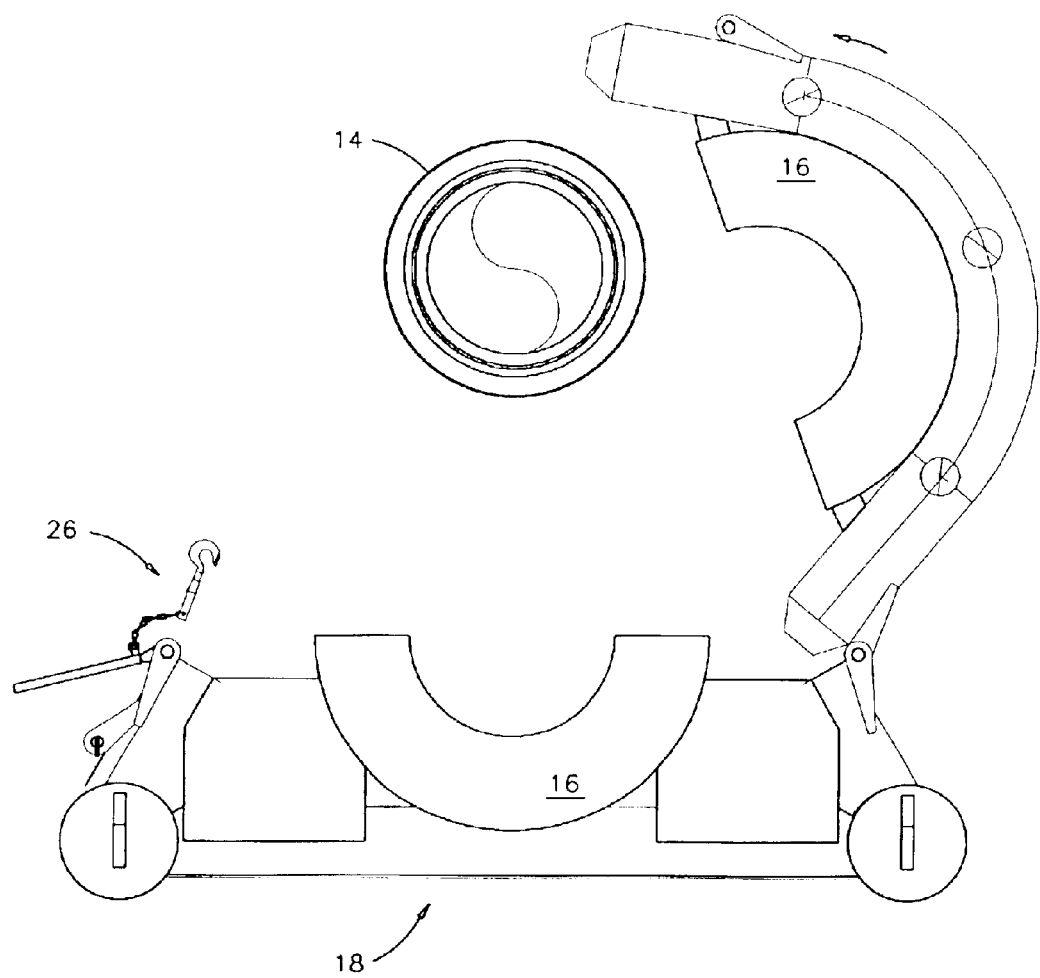
FIG. 3 is an end view of the invention with the rings and support structure not attached to the collars.

Referring to the drawings, it is seen in FIG. 1 that the invention is generally indicated by the numeral 10. As best seen in FIG. 2–4, rotatable pipeline end termination 10 is generally comprised of a conduit 12, collar 14, ring 16, and pipeline support structure 18.

The conduit 12 is attached to an end of the pipeline 20 by any suitable means such as a threaded, welded, or flanged connection. The conduit 12 is coaxial with the pipeline 20.

As best seen in FIGS. 2 and 3, a collar 14 is rigidly attached/welded at each end of the conduit 12 so as to be coaxial with the conduit 12. The collar has an outer diameter that is greater than the outer diameter of the conduit 12 and the pipeline 20.

A ring 16 is rotatably received on each collar 14. Each ring 16 is provided with a recessed groove 22 that is sized to rotatably receive the collar 14. Each ring 16 is formed from halves that are rigidly attached to the pipeline support structure 18.

The portion of the pipeline support structure 18 that receives the rings 16 is provided with a pivot connection 24 that allows the rings to be opened for installation around, or removed from, the collars and conduit installed on the pipeline.

As best seen in FIG. 4, means for retaining the ring 16 around the collar is provided in the form of a load binder clamp 26. However, it should be understood that any suitable retention means may be used to secure the closing.

In operation, a conduit 12 is attached to the end of a pipeline 20 by any suitable means such as a threaded, welded, or flanged connection. A collar 14 is installed on the first end of the conduit 12 attached to the pipeline 20. A second collar 14 is installed on the second end of the conduit 12. A section of pipe 28 may be attached to the second end of the conduit 12. This section of pipe 28 may be the connection to a manifold, wellhead, or other source of fluid. Rings 16 and pipeline support structure 18 are positioned adjacent the conduit and collars as seen in FIGS. 2 and 3. The rings 16 are closed around the collars 14 such that the collars 14 are rotatably received in the recessed groove 22 in each ring 16. The rings 16 are locked in position around the collars 14 by the use of a suitable locking mechanism such as a load binder clamp 26.

When the pipeline is lowered to the sea floor, the pipeline support structure 18 is able to freely rotate around the collars. The weight of the pipeline support structure 18 causes it to be oriented such that the flat closed bottom structure 30 and horizontal legs 32 will rest flat on the sea floor for full bearing contact.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A rotatable pipeline end termination, comprising:
   a. a conduit attached to one end of a pipeline so as to be coaxial with the pipeline;
   b. at least two collars rigidly attached to said conduit and spaced apart along the length of said conduit;
   c. a ring rotatably received on each of said collars, and
   d. a pipeline support structure attached to said rings, said pipeline support structure comprising a flat closed bottom structure acting as a mud mat.

2. A rotatable pipeline end termination, comprising:
   a. a conduit having first and second ends attached to one end of a pipeline so as to be coaxial with the pipeline;
   b. a collar rigidly attached at each end of said conduit;
   c. a ring rotatably received on each of said collars; and
   d. a pipeline support structure attached to said rings, said pipeline support structure comprising a flat closed bottom structure acting as a mud mat.

* * * * *